United States Patent
Mamedov

(10) Patent No.: US 9,227,185 B2
(45) Date of Patent: Jan. 5, 2016

(54) NICKEL/LANTHANA CATALYST FOR PRODUCING SYNGAS

(75) Inventor: Agaddin Mamedov, Sugar Land, TX (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 1146 days.

(21) Appl. No.: 13/256,603

(22) PCT Filed: Mar. 15, 2010

(86) PCT No.: PCT/EP2010/001619
§ 371 (c)(1),
(2), (4) Date: Sep. 14, 2011

(87) PCT Pub. No.: WO2010/105788
PCT Pub. Date: Sep. 23, 2010

(65) Prior Publication Data
US 2012/0007025 A1 Jan. 12, 2012

(30) Foreign Application Priority Data
Mar. 16, 2009 (EP) .................... 09075117

(51) Int. Cl.
| | |
|---|---|
| *B01J 23/10* | (2006.01) |
| *B01J 37/16* | (2006.01) |
| *B01J 23/00* | (2006.01) |
| *B01J 23/83* | (2006.01) |
| *C01B 3/40* | (2006.01) |
| *B01J 35/02* | (2006.01) |
| *B01J 37/02* | (2006.01) |

(52) U.S. Cl.
CPC ................ *B01J 37/16* (2013.01); *B01J 23/002* (2013.01); *B01J 23/83* (2013.01); *C01B 3/40* (2013.01); *B01J 35/023* (2013.01); *B01J 37/0201* (2013.01); *B01J 2523/00* (2013.01); *C01B 2203/0244* (2013.01); *C01B 2203/1058* (2013.01); *C01B 2203/1082* (2013.01)

(58) Field of Classification Search
CPC .......... B01J 23/83; B01J 23/002; B01J 37/16; B01J 37/40; B01J 37/0201; B01J 35/023; B01J 2523/00; B01J 2523/3706; B01J 2523/847; C01B 3/40; C01B 2203/1082; C01B 2203/1058; C01B 2203/0244
See application file for complete search history.

(56) References Cited

U.S. PATENT DOCUMENTS

| | | |
|---|---|---|
| 4,177,203 A | 12/1979 | Kolbel et al. |
| 5,447,705 A | 9/1995 | Petit et al. |
| 2004/0127351 A1 | 7/2004 | Basile et al. |

FOREIGN PATENT DOCUMENTS

| | | |
|---|---|---|
| EP | 0741107 A2 | 11/1996 |
| WO | 03041860 A2 | 5/2003 |
| WO | 03076074 A1 | 9/2003 |

OTHER PUBLICATIONS

Bl et al.; "Selective Production of C4 Hydrocarbons from Syngas Using Fe—Co/ZrO2 and SO42—/ZrO2 Catalysts"; The Canadian Journal of Chemical Engineering; vol. 81; Apr. 2003; pp. 230-242.
Commereuc et al.; Catalytic Synthesis of Low Molecular Weight Olefins from CO and H2 with Fe(CO)5, Fe3(CO) 12, and [HFe3(CO)11]-Supported on Inorganic Oxides; J.C.S. Chem. Comm.; 1980; pp. 154-155.
Okuhara et al.; Synthesis of Light Olefins from CO and H2 over Highly Dispersed Ru/K—Al2O3 Derived from Ru3 (CO)12; J.C.S. Chem. Comm.; 1981; pp. 1114-1115.
International Search Report; International Application No. PCT/EP2010/001619; International Filing Date: Mar. 15, 2010; Date of Mailing: Dec. 28, 2010; 4 Pages.
Written Opinion of the International Searching Authority; International Application No. PCT/EP2010/001619; International Filing Date: Mar. 15, 2010; Date of Mailing: Dec. 28, 2010; 4 Pages.
Swaan et al.; "Deactiviation of Supported Nickel Catalysts During the Reforming of Methane by Carbon Dioxide"; Catalysis Today; vol. 21; 1994; pp. 571-578.
Zhang et al.; A Stable and Active Nickel-Based Catalyst for Carbon Dioxide Reforming of Methane to Synthesis Gas; J. Chem. Soc., Chem. Commun., 1995; pp. 71-72.

*Primary Examiner* — Melvin C Mayes
*Assistant Examiner* — Smita Patel
(74) *Attorney, Agent, or Firm* — Cantor Colburn LLP

(57) ABSTRACT

The present invention relates to a nickel/lanthana-($Ni/La_2O_3$) catalyst for producing syngas from a hydrocarbon feedstream that is prepared in situ by depositing nickel (Ni) on a lanthana ($La_2O_3$) support by contacting said $La_2O_3$ support with an aqueous nickel-salt (Ni-salt) solution in the presence of an oxygen-comprising gas stream which is followed by reducing the deposited Ni. The catalyst of the present invention is characterized in that it can be continuously operated for more than 14 days in a process for producing syngas from a hydrocarbon feedstream without showing a significant loss of catalyst activity.

15 Claims, No Drawings

US 9,227,185 B2

NICKEL/LANTHANA CATALYST FOR PRODUCING SYNGAS

CROSS REFERENCE TO RELATED APPLICATIONS

This application is a 371 of International Application No. PCT/EP2010/001619, filed Mar. 15, 2010, which claims priority to European Application No. 09075117.3, filed Mar. 16, 2009, both of which are hereby incorporated by reference in its entirety.

TECHNICAL FIELD

The present invention relates to a method for the preparation of a nickel/lanthana-comprising catalyst. Said catalyst is suitable for reforming a hydrocarbon feed to produce syngas.

BACKGROUND ART

Processes for reforming hydrocarbons to produce a reformed gas composition comprising synthesis gas, also called syngas, are known in the art and include steam reforming, catalytic dry reforming, partial oxidation or combinations thereof.

Steam reforming of hydrocarbons is a well known method for producing syngas and involves contacting the hydrocarbon with steam. Steam reforming is highly endothermic and requires high reaction temperatures of e.g. 700-1100° C. Accordingly, care should be taken to avoid thermodynamic constraints. Furthermore, steam reforming of hydrocarbons requires relatively long contact times. Typically, the syngas mixture produced by steam reforming of a hydrocarbon such as methane has a very high H2/CO ratio of approximately 4.5-5.2. The H2/CO ratio of syngas produced by steam reforming methane may be adapted e.g. by adding CO or by removing H2. Alternatively, the H2/CO ratio of a syngas composition may be adapted to a desired value by subjecting it to the reverse water-gas shift reaction.

A syngas composition with a H2/CO ratio of approximately 1 can be produced directly by catalytic dry reforming of methane with CO2. Also catalytic dry reforming of methane is highly endothermic and should be executed at high reaction temperatures. Many catalytic dry reforming processes are known to involve rapid coke deposition leading to catalyst inactivation. In these catalytic dry reforming processes the reactor can be regenerated by feeding oxygen to the catalyst under high temperatures.

Partial oxidation in the presence of a hydrocarbon feed is a further means to produce a syngas mixture. A disadvantage of partial oxidation is that carbon dioxide is produced as a by product, which limits the selectivity for aliphatic and aromatic C2-C6 hydrocarbons of the hydrocarbon reforming process.

By combining different reforming reactions including those described herein above, the reforming process can be optimized e.g. by circumventing thermodynamic constraints and/or by reducing the costs for heating or process heat removal.

A particularly advantageous combined reforming process for producing syngas is catalytic autothermal dry reforming of lower hydrocarbons such as methane. By contacting a mixture of methane (CH4), oxygen (O2) and carbon dioxide (CO2) with a catalyst, endothermic dry reforming and exothermic methane oxidation can be performed in a single regime, which represents an effective means to decrease the energy consumption during syngas synthesis; see e.g. MOR-TOLA, et al. Eds. NORONHA, et al. Elsevier, 2007. p. 409-414. A further advantage of autothermal dry reforming is that the H2/CO ratio of the produced syngas composition is approximately 1.4-1.8, which is highly advantageous for the further use of the produced syngas in processes such as Fischer-Tropsch (F-T) synthesis.

It has been described that also nickel-based catalysts may be used in a process for the partial oxidation of light hydrocarbons to syngas. Particularly, catalysts comprising nickel supported on lanthana are known to allow a relative high conversion and selectivity in a process for producing syngas from light hydrocarbons; see e.g. EP 741107 A; U.S. Pat. No. 5,447,705 and US 2004/0127351.

A drawback when using a conventional Ni/La2O3 reforming catalyst in autothermal dry reforming of e.g. methane is deactivation of the catalyst, at least partially due to coke formation. This catalyst deactivation leads to a reduced hydrocarbon selectivity and reduced process economy.

The technical problem underlying the present invention is the provision of an improved catalyst useful in a process for converting hydrocarbons such as methane to syngas.

DISCLOSURE OF INVENTION

The solution to the above problem is achieved by providing the embodiments as described herein below and as characterized in the claims.

Accordingly, the present invention provides a method for preparing a nickel/lanthana-(Ni/La$_2$O$_3$) catalyst comprising the steps of (a) depositing nickel (Ni) on a lanthana (La$_2$O$_3$) support by contacting said La$_2$O$_3$ support with an aqueous nickel-salt (Ni-salt) solution in the presence of an oxygen-comprising gas stream; followed by (b) reducing the deposited Ni, whereby said Ni/La$_2$O$_3$ catalyst is prepared in situ; or—stated otherwise—wherein both process steps (a) and (b) are performed in situ.

Conventionally, Ni/La$_2$O$_3$ reforming catalysts are produced by chemical vapour deposition of Ni on La$_2$O$_3$ before loading the produced Ni/La$_2$O$_3$ catalyst particles into a catalyst enclosure. These previously described Ni/La$_2$O$_3$ catalysts, however, exhibit a reduced hydrocarbon conversion rate after prolonged catalyst operation and, thus, gradually become deactivated. In the context of the present invention, it was surprisingly found that a Ni/La$_2$O$_3$ reforming catalyst that is prepared in situ can be continuously operated for more than 14 days without showing a significant loss of catalyst activity. This leads to superior activity of in situ prepared Ni/La$_2$O$_3$ catalyst of the present invention after prolonged catalyst operation when compared to a conventionally prepared Ni/La$_2$O$_3$ reforming catalyst.

The term "in situ" is well known in the field of chemical engineering and refers to industrial plant operations or procedures that are performed in place. For example, aged catalysts in industrial reactors may be regenerated in place (in situ) without being removed from the reactors; see e.g. WO 03/041860 and WO 03/076074. In the context of the present invention, accordingly, a catalyst that is prepared in situ refers to a catalyst that is prepared in place, i.e. in the same enclosure that is later present in the process installation in which the catalysed process takes place.

In one embodiment, the method of the present invention is performed in such way that the Ni/La$_2$O$_3$ catalyst is prepared in a catalyst enclosure that is situated in the process installation, like a reactor for making syngas, wherein the Ni/La$_2$O$_3$ catalyst is to be employed. In a further embodiment, the method of the present invention is performed in such way that the Ni/La$_2$O$_3$ catalyst is prepared in a catalyst enclosure which can be directly placed into said process installation.

In the method of the present invention, the La$_2$O$_3$ support is preferably contacted with a Ni-salt solution in step (a) as described herein above until at least approximately 0.1 mass % Ni, preferably approximately 1 mass % Ni but no more than approximately 5 mass % Ni, preferably no more than 4 mass % Ni is deposited on the La$_2$O$_3$ support. Most preferably, approximately 3 mass % Ni is deposited on the La$_2$O$_3$ support. In the context of the present invention, the mass % of Ni load of the catalyst is calculated based on the weight of the La$_2$O$_3$ support.

The aqueous Ni-salt solution that is preferably used to deposit Ni on the La$_2$O$_3$ support in the method of the present invention is an aqueous solution of Ni(NO$_3$)$_2$. However, the skilled artisan is readily capable of selecting other suitable Ni-salts for preparing a Ni-salt solution that may be used in the method of the present invention. Such a suitable Ni-salt includes, but is not limited to, Nickel acetate.

When selecting the size of La$_2$O$_3$ support particles it should be considered that selecting a too small La$_2$O$_3$ particle size (high mesh size number) may be associated with an undesirable pressure drop in the reactor, whereas selecting a too big La$_2$O$_3$ particle size (low mesh size number) may lead to an ineffective impregnation with the Ni-salt solution. In one embodiment, the La$_2$O$_3$ support are La$_2$O$_3$ particles having a particle size of approximately 14 to 60 mesh before contacting the La$_2$O$_3$ support with the aqueous Ni-salt solution. More preferably, La$_2$O$_3$ particles of 25 to 40 mesh are used in the method of the present invention. Mesh is understood to refer to standardized mesh sizes, as defined by a.o. ASTM E 11-70.

The lanthana (La$_2$O$_3$) support may further comprise a suitable inert binder such as alumina (Al$_2$O$_3$), silica (SiO$_2$), titania (TiO$_2$), zirconia (ZrO$_2$), magnesia (MgO) and mixtures thereof. In this case the La$_2$O$_3$ support is combined with the binder by conventional methods, e.g. MgO—La$_2$O$_3$, and then in-situ impregnated with Ni. However, it is preferred that the catalyst of the present invention does not comprise such a binder.

The Ni-salt solution is deposited on the La$_2$O$_3$ support in the presence of a gas stream comprising molecular oxygen. Without wishing to be bound by any theory, it is believed that the presence of oxygen allows the production of Ni-oxide phase and thus prevents segregation of metallic Ni-phase, which can form in the support medium when deposited without sufficient molecular oxygen present. Preferably, the La$_2$O$_3$ support is contacted with an oxygen-comprising gas stream having a temperature of approximately 450° C. before contacting the La$_2$O$_3$ support with the Ni-salt solution. Preferably, the La$_2$O$_3$ support is contacted with said oxygen-comprising gas stream for at least 30 minutes and more preferably for at least 45 minutes, but not longer than 24 hours and more preferably no longer than 8 hours before contacting the La$_2$O$_3$ support with the Ni-salt solution. Most preferably, the he La$_2$O$_3$ support is contacted with said oxygen-comprising gas stream for approximately 1-2 hours before contacting the La$_2$O$_3$ support with the Ni-salt solution.

Further gaseous components comprised in the oxygen-comprising gas stream present when depositing the Ni-salt solution on the La$_2$O$_3$ may be selected from the group consisting of methane (CH$_3$), carbon dioxide (CO$_2$) and one or more inert gasses. The term "inert gas" as used herein relates to any element or compound that is in gas phase under the corresponding conditions and which does not participate in and/or interfere with the process or chemical reactions taking place during the corresponding process step. Accordingly, the "inert gas" that may be present in the respective gas stream can act as an inert diluent of the remaining gas components of the reformed gas. A preferred the inert gas in the context of the present invention is nitrogen (N$_2$). In one embodiment, the oxygen-comprising gas stream present when depositing the Ni-salt solution has the same composition as the hydrocarbon comprising feed stream that is subjected to autothermal dry reforming to produce syngas in the presence of the catalyst produced in the method of this invention. Even more preferably, the oxygen-comprising gas stream present when depositing the Ni consists of approximately 27-30% mole CH$_4$+ 10-12% mole O$_2$+17-18% mole CO$_2$+41-44% mole N$_2$ (the total amounting 100%), more preferably of about 28.4% mole CH$_4$+11% mole O$_2$+17.4% mole CO$_2$+42.8% mole N$_2$.

After depositing Ni on the La$_2$O$_3$ support until the desired Ni load is achieved, the deposited Ni is reduced in situ to its metallic state. The deposited Ni is preferably reduced by contacting the deposited Ni for 30 minutes to 24 hours with a methane-comprising gas stream having approximately 650° C.-750° C. Most preferably, the deposited Ni is reduced at about 660° C.

Further gaseous components comprised in the methane-comprising gas stream used in the reducing step of the present method may be selected from the group consisting of O$_2$, CO$_2$ and inert gasses as defined herein above. In one embodiment, the methane-comprising gas stream for reducing the Ni-salt solution has the same composition as the hydrocarbon comprising feed stream that is subjected to autothermal dry reforming to produce syngas in the presence of the catalyst produced in the method of this invention. In that case, the produced Ni/La$_2$O$_3$ initially fully oxidizes methane to carbon dioxide. When reaching steady state condition, the deposited Ni is reduced and the in situ produced Ni/La$_2$O$_3$ produces syngas. Even more preferably, the methane-comprising gas stream for reducing the deposited Ni consists of approximately 27-30% mole CH$_4$+10-12% mole O$_2$+17-18% mole CO$_2$+41-44% mole N$_2$ (the total amounting 100%), more preferably of about 28.4% mole CH$_4$+11% mole O$_2$+17.4% mole CO$_2$+42.8% mole N$_2$.

In a further embodiment, the present invention relates to a process for producing syngas comprising contacting a hydrocarbon feed stream suitable for producing syngas with a catalyst produced by the method of the present invention as described herein above and as characterized in the claims. Accordingly, the present invention further relates to a process for producing syngas comprising preparing a Ni/La$_2$O$_3$ catalyst comprising (a) depositing nickel (Ni) on a La$_2$O$_3$ support by contacting said La$_2$O$_3$ support with an aqueous Ni-salt solution in the presence of an oxygen-comprising gas stream; followed by (b) reducing the deposited Ni, whereby said Ni/La$_2$O$_3$ catalyst is prepared in situ and subsequently contacting said prepared catalyst with a hydrocarbon feed stream suitable for producing syngas.

The hydrocarbons comprised in the hydrocarbon feed may include gaseous hydrocarbons such as methane, ethane, natural gas or liquefied petroleum gas (LPG) but also more heavy hydrocarbons such as C6+ hydrocarbons. Preferably, the main hydrocarbon constituent comprised in the hydrocarbon feed of the process of the present invention is methane. In the context of the present invention, the term "main hydrocarbon constituent" means that a given hydrocarbon constitutes more than 50% mole of all comprised hydrocarbons, more preferably more than 60% mole of all comprised hydrocarbons, even more preferably more than 70% mole of all comprised hydrocarbons, and most preferably of more than 75% mole of all comprised hydrocarbons. Accordingly, the present invention particularly preferably relates to a process for the catalytic autothermal dry reforming of methane (ATDRM) which comprises contacting the Ni/La$_2$O$_3$ catalyst produced in situ as described herein above with a methane-comprising hydrocarbon feed stream.

Further gaseous components comprised in the hydrocarbon feed as used in the reforming process of the present invention may be selected from the group consisting of O$_2$, CO$_2$ and one or more inert gasses as defined herein. In one embodiment the hydrocarbon comprising feed stream that is contacted with the catalyst produced in the method of this invention has the same composition as the oxygen-comprising gas stream present when depositing the Ni and/or the methane-comprising gas stream for reducing the Ni-salt solution when in situ preparing the catalyst of the present invention. Even more preferably, the hydrocarbon feed stream of the reforming process of the present invention consists of approximately 27-30% mole CH$_4$+10-12% mole O$_2$+17-18% mole CO$_2$+41-44% mole N$_2$ (the total amounting 100%), more preferably of about 28.4% mole CH$_4$+11% mole O$_2$+17.4% mole CO$_2$+42.8% mole N$_2$. It is evident that this composition may be changed or adapted under certain circumstances. Yet, a methane/O$_2$ ratio of more than about 3 should be avoided since a too low oxygen content leads to catalyst deactivation due to coke formation. At methane/O$_2$ ratio of less than 2.5 is also less favourable due to catalyst over-oxidation (too many oxide phases in catalyst).

It is well within the scope of the skilled artisan to determine suitable process conditions for performing a process for producing syngas comprising contacting a suitable hydrocarbon feed stream with a catalyst produced by the method of the present invention. Preferably, the (reforming) process of the present invention is performed at a reaction temperature of 650° C. to 750° C. and a contact time of 0.4 to 2 seconds. More preferred are a reaction temperature of 680° C. to 710° C. and a contact time of 0.4 to 1 seconds. At a reaction temperature of less than 680° C. the conversion may start to decrease undesirably.

The term "reformed gas" as used herein relates to the gaseous product of the reforming process as described herein and essentially consists of syngas (H$_2$ and CO), oxygen (O$_2$) and optionally a further component selected from the group consisting of methane (CH$_4$), carbon dioxide (CO$_2$) and inert gas.

The main constituent of the "reformed gas", accordingly, is synthesis gas (syngas; a mixture of H$_2$ and CO). The reformed gas of the present invention comprises at least 50% mole and preferably at least 55% mole syngas. Preferably, the syngas present in the reformed gas produced by the reforming process of the present invention has a hydrogen (H$_2$) to carbon monoxide (CO) ratio of at least 1, more preferably of at least 1.2, even more preferably of at least 1.4 and particularly preferably of at least 1.6, but preferably of not more than 4, more preferably of not more than 3, even more preferably of not more than 2 and particularly preferably of not more than 1.8. Most preferably, the "reformed gas" has a H$_2$ to CO ratio of at least 1.6 but not more than 1.8 (H$_2$ to CO ratio of 1.6-1.8).

The "reformed gas" of the present invention may comprise at least 0.1% mole O$_2$, more preferably at least 0.2% mole O$_2$, even more preferably at least 0.3% mole O$_2$ and particularly preferably at least 0.35% mole O$_2$. Furthermore, the "reformed gas" of the present invention comprises not more than 5% mole O$_2$, more preferably not more than 2.5% mole O$_2$ and even more preferably not more than 1% mole O$_2$ and particularly preferably not more than 0.5% mole O$_2$. Most preferably, the reformed gas made in the process of the present invention comprises 0.4% mole oxygen (O$_2$).

As described herein below, a feedstream comprising CH$_4$, O$_2$ and CO$_2$ may be converted by catalytic dry reforming by contacting said feedstream with an in situ prepared Ni/La$_2$O$_3$ catalyst at a reaction temperature 710° C. to produce a reformed gas that approximately comprises 22% mole CO, 35% mole H$_2$ and 0.4% mole O$_2$.

The "reformed gas" produced by reforming hydrocarbons may be directly used as a feed for further processes including, but not limited to, F-T synthesis or carbonylation reactions like alkene hydrocarbonylation or aromatic hydrocarbons hydrocarbonylation to produce aromatic aldehydes.

F-T synthesis is a well known catalyzed chemical reaction in which synthesis gas, a mixture of carbon monoxide and hydrogen, is converted into a complex mixture of hydrocarbon compounds by contacting syngas with an F-T catalyst under F-T synthesis conditions; see e.g. KANEKO TAKAO, et al. Ullmann's Encyclopedia of Industrial Chemistry. 7th edition. John Wiley, 1997. p. 17-31.

The most common catalysts useful in F-T synthesis ("F-T catalysts") are based on Fe and/or Co, although Ni- and Ru-based catalysts have also been described; see e.g. U.S. Pat. No. 4,177,203; COMMEREUC, et al. *J. Chem. Soc., Chem. Commun.* 1980, p. 154-155; OKUHARA, et al. *J. Chem. Soc., Chem. Commun.* 1981, p. 1114-1115. Generally, Ni-based catalysts are relatively more selective for producing methane whereas Co-, Fe- and Ru-based catalysts are more selective for hydrocarbons having at least one carbon atom (C2+ hydrocarbons). Moreover, the selectivity for C2+ hydrocarbons can be increased by decreasing the H$_2$/CO ratio, decreasing the reaction temperature and decreasing the reactor pressure.

A suitable Fischer-Tropsch catalyst that may be used is a cobalt/iron bi-component oxide (Co/Fe—O) catalyst. The cobalt/iron bi-component oxide may be supported on an inert support. Suitable inert supports for Fischer-Tropsch catalysts are known in the art and include alumina (Al$_2$O$_3$), silica (SiO$_2$), titania (TiO$_2$), zirconia (ZrO$_2$) and magnesia (MgO) and mixtures thereof. Preferably the cobalt/iron bi-component oxide is supported on silica (SiO$_2$). Such a Co/Fe—O—SiO$_2$ catalyst is described in YONGHONG BI, et al. *The Canadian Journal of Chemical Engineering* 2003, vol. 81, p. 230-242.

In yet another embodiment, the present invention relates to Ni/La$_2$O$_3$ catalyst produced by the method of the present invention as described herein above and as characterized in the claims. The Ni/La$_2$O$_3$ catalyst provided by the present invention is characterized by its increased stability which allows continuous operation of the catalyst in the reforming process described herein above and as characterized in the claims for more than 14 days without showing a significant loss of catalyst activity.

MODE(S) FOR CARRYING OUT THE INVENTION

The present invention will now be more fully described by the following non-limiting Examples.

EXAMPLE 1

The reforming catalyst "3% Ni/La2O3 in situ" for autothermal dry reforming of methane was prepared as follows: 2 ml La2O3 particles of 25-40 mesh size were loaded in the quartz reactor with an inner diameter of 12 mm and a length of 45 cm. The loaded reactor was fed with a gaseous mixture consisting of approximately 28.4% mole CH4+11% mole O2+17.4% mole CO2+42.8% mole N2 at 450° C. After treatment of the support with reaction mixture (less than 24 hours) to obtain a stable phase composition, impregnation of the La2O3 support with a 0.1-0.3% Ni(NO3)2 solution in water was started. Therefore the 0.1-0.3% Ni(NO3)2 solution was fed to the La2O3 support by injecting into the gas stream to gradually impregnate the La2O3 support with the Ni salt. The Ni(NO3)2 impregnation of the La2O3 support was continued until the calculated amount of 3 mass % Ni /La2O3 basis was reached. Formation of NO2 was observed during the Ni(NO3)2 impregnation step which indicates that oxides of Ni are formed within the La2O3 support.

After completing the Ni(NO3)2 impregnation step, the reaction temperature was increased to 660° C. to reduce the Ni-oxide with the methane containing gaseous mixture (as above). The resultant in situ prepared reforming catalyst "3% Ni/La2O3 in situ" initially fully oxidizes methane to CO2. However after reaching steady state condition the "3% Ni/La2O3 in situ" catalyst forms CO and H2.

Contacting the methane containing feed stream with the reforming catalyst "3% Ni/La2O3 in situ" was continued at 680-710° C. with a contact time of 0.5 sec to produce a syngas composition consisting of approximately 21.5% mole CO+35.5% mole H2+34.79% mole N2+6.17% mole CH4+ 1.55% mole CO2+0.4% mole O2. A quartz reactor with an inner diameter of 12 mm located in an electrically heated furnace with 45 cm length was used. As shown in Table 1 provided herein below, the in situ prepared Ni/La2O3 catalyst showed stable activity for more than 120 hours.

Experiment 2 (Comparative)

Conventional Ni/La2O3 catalysts are prepared by impregnation of La2O3 powder with a Ni(NO3)2 solution at 70-80° C., to result in a Ni content of 3 mass % (as in Ex. 1). Subsequently, the Ni impregnated La2O3 is kept at 70-80° C. until all water has evaporated. The solid mixture is then dried at 120° C. and is calcined at 700° C. for 4 hours. Subsequently, the calcined Ni/La2O3 particles are loaded into in a quartz reactor with an inner diameter of 12 mm which functioned as catalyst enclosure.

A feed stream consisting of approximately 28.4% mole CH4+11% mole O2+17.4% mole CO2+42.8% mole N2 was contacted with 0.5 ml the conventionally prepared Ni/La2O3 reforming catalyst at 680° C.-710° C. with a contact time of 0.5 sec to produce a syngas composition.

As shown in Table 1 provided herein below, the activity of a reforming catalyst prepared by impregnation of La2O3 with Ni salt gradually declined within 14 days of operation.

TABLE 1

| Catalyst screening duration (days) | CH$_4$ conversion (%) | |
|---|---|---|
| | In situ prepared catalyst (Example 1) | Conventionally prepared catalyst (Experiment 2) |
| 5 | 73.7 | 72.5 |
| 14 | 73.0 | 65.8 |

As can be derived from Table 1, the in situ prepared catalyst can be continuously operated for more than 14 days without showing a significant loss of catalyst activity. This leads to superior activity of the catalyst of the present invention after prolonged catalyst operation, as can be derived from the significantly higher methane conversion rate after 14 days of catalyst operation when compared to a conventional catalyst prepared by chemical vapour deposition of Ni on $La_2O_3$.

The invention claimed is:

1. A method for preparing a nickel/lanthana-(Ni/$La_2O_3$) catalyst comprising:
   (a) depositing nickel (Ni) on a lanthana ($La_2O_3$) support by contacting said $La_2O_3$ support with an aqueous nickel-salt (Ni-salt) solution in the presence of an oxygen-comprising gas stream; followed by
   (b) reducing the deposited Ni-salt,
   wherein both process steps (a) and (b) are performed in situ; and
   wherein said $La_2O_3$ support is contacted for 30 minutes to 24 hours with an oxygen-comprising gas stream at approximately 450° C. before contacting the $La_2O_3$ support with the Ni-salt solution.

2. The method of claim 1, wherein said Ni/$La_2O_3$ catalyst is prepared in a catalyst enclosure that is situated in a process installation wherein the Ni/$La_2O_3$ catalyst is to be employed; or wherein said Ni/$La_2O_3$ catalyst is prepared in a catalyst enclosure which can be directly placed into said process installation.

3. The method of claim 1, wherein said $La_2O_3$ support is contacted with said Ni-salt solution in step (a) until 0.1 to 5 mass % Ni based on $La_2O_3$ support is deposited on the $La_2O_3$ support.

4. The method of claim 1, wherein said Ni-salt solution is a solution of $Ni(NO_3)_2$.

5. The method of claim 1, wherein said $La_2O_3$ support are $La_2O_3$ particles having a particle size of approximately 14 to 60 mesh before contacting the $La_2O_3$ support with the aqueous Ni-salt solution.

6. The method of claim 1, wherein the deposited Ni is reduced by contacting said deposited Ni for 30 minutes to 24 hours with a methane-comprising gas stream having 650° C.-750° C.

7. A method for preparing a nickel/lanthana-(Ni/$La_2O_3$) catalyst comprising:
   (a) depositing nickel (Ni) on a lanthana ($La_2O_3$) support by contacting said $La_2O_3$ support with an aqueous nickel-salt (Ni-salt) solution in the presence of an oxygen-comprising gas stream, wherein said gas stream consists of approximately 27-30% mole $CH_4$+10-12% mole $O_2$+17-18% mole $CO_2$ +41-44% mole $N_2$, the total amounting 100%; followed by
   (b) reducing the deposited Ni-salt,
   wherein both process steps (a) and (b) are performed in situ.

8. Catalyst produced by the method of claim 7.

9. The method of claim 7, wherein said $La_2O_3$ support is contacted with said Ni-salt solution in step (a) until 0.1 to 5 mass % Ni based on $La_2O_3$ support is deposited on the $La_2O_3$ support.

10. The method of claim 7, wherein said Ni-salt solution is a solution of $Ni(NO_3)_2$.

11. The method of claim 7, wherein said $La_2O_3$ support are $La_2O_3$ particles having a particle size of approximately 14 to 60 mesh before contacting the $La_2O_3$ support with the aqueous Ni-salt solution.

12. The method of claim 7, wherein said $La_2O_3$ support is contacted for 30 minutes to 24 hours with an oxygen-comprising gas stream at approximately 450° C. before contacting the $La_2O_3$ support with the Ni-salt solution.

13. The method of claim 12, wherein the deposited Ni is reduced by contacting said deposited Ni for 30 minutes to 24 hours with a methane-comprising gas stream having 650° C.-750° C.

14. A process for producing syngas comprising:
   contacting a hydrocarbon feed stream suitable for producing syngas with a catalyst, wherein said hydrocarbon feed stream consists of approximately 27-30% mole $CH_4$+10-12% mole $O_2$+17-18% mole $CO_2$+41-44% mole $N_2$, the total amounting 100%;
   wherein the catalyst is formed by the method comprising
   (a) depositing nickel (Ni) on a lanthana ($La_2O_3$) support by contacting said $La_2O_3$ support with an aqueous nickel-salt (Ni-salt) solution in the presence of an oxygen-comprising gas stream; followed by
   (b) reducing the deposited Ni-salt,
   wherein both process steps (a) and (b) are performed in situ.

15. The process according to claim 14, wherein said process is performed at a reaction temperature of 650° C. to 750° C. and a contact time of 0.4 to 2 seconds.

\* \* \* \* \*